(12) United States Patent
Stern

(10) Patent No.: US 10,127,474 B2
(45) Date of Patent: Nov. 13, 2018

(54) IMAGE BREATHING CORRECTION SYSTEMS AND RELATED METHODS

(71) Applicant: SEMICONDUCTOR COMPONENTS INDUSTRIES, LLC, Phoenix, AZ (US)

(72) Inventor: Jonathan Michael Stern, San Carlos, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 62 days.

(21) Appl. No.: 15/165,161

(22) Filed: May 26, 2016

(65) Prior Publication Data
US 2017/0134620 A1    May 11, 2017

Related U.S. Application Data

(60) Provisional application No. 62/253,479, filed on Nov. 10, 2015.

(51) Int. Cl.
| | | |
|---|---|---|
| *H04N 5/232* | (2006.01) | |
| *H04N 17/00* | (2006.01) | |
| *G06K 9/62* | (2006.01) | |

(52) U.S. Cl.
CPC ....... *G06K 9/6202* (2013.01); *H04N 5/23212* (2013.01); *H04N 17/002* (2013.01)

(58) Field of Classification Search
CPC ............... G06K 9/6202; H04N 17/002; H04N 5/23212; H04N 5/23241; H04N 5/23219;
(Continued)

(56) References Cited

U.S. PATENT DOCUMENTS

| | | | | |
|---|---|---|---|---|
| 2011/0254995 A1* | 10/2011 | Harding | ................. | H04N 5/217 348/345 |
| 2013/0083246 A1* | 4/2013 | Chen | ...................... | G06T 5/002 348/620 |

(Continued)

OTHER PUBLICATIONS

Imatest LLC, SFTplus Distortion and Field of View Measurements, 2004-2015; retrieved from the Internet at http://www.imatest.com/docs/sfrplus-distortion-measurements/[Jul. 9, 2015 9:19:41 AM].

(Continued)

*Primary Examiner* — Albert Cutler
(74) *Attorney, Agent, or Firm* — IPTech Law

(57) ABSTRACT

Methods of image breathing correction. Implementations may include capturing and displaying a first image to a user using a lens, an image sensor, memory, and a display included in a camera unit, adjusting a position of the lens, capturing a second image and storing data of the second image collected by the image sensor in the memory. The method may include determining a second position of the lens using a lens position sensor included in the camera unit and calculating a change in magnification from the first image to the second image using a processor and a breathing correction model. The method may include rescaling the data of the second image to generate corrected second image data using the processor and displaying the corrected second image to a user. The corrected second image may be substantially free from breathing effects when compared with the first image.

19 Claims, 4 Drawing Sheets

(58) Field of Classification Search
CPC ............. H04N 5/23216; H04N 5/2252; H04N 5/23293
USPC .......................................... 348/188, 345–356
See application file for complete search history.

(56) References Cited

U.S. PATENT DOCUMENTS

2014/0313374 A1\* 10/2014 Cao .................... H04N 5/23212
  348/240.1
2015/0097976 A1\* 4/2015 Nakanishi .............. H04N 5/145
  348/208.1
2016/0150151 A1\* 5/2016 Nobayashi ......... H04N 5/23212
  348/348
2016/0227120 A1\* 8/2016 Lee .................... H04N 5/23287

OTHER PUBLICATIONS

Imatest LLC, Distortion, 2004-2015; retrieved from the Internet at http://www.imatest.com/docs/distortion/[Jul. 9, 2015 9:38:03 AM].

\* cited by examiner

IMAGE BREATHING CORRECTION SYSTEMS AND RELATED METHODS

CROSS-REFERENCE TO RELATED APPLICATIONS

This application claims priority to U.S. Provisional Application No. 62/253,479, filed on Nov. 10, 2015, entitled "Image Breathing Correction Systems and Related Methods," invented by John Michael Stern, and is incorporated herein by reference and priority thereto for common subject matter is hereby claimed.

BACKGROUND

1. Technical Field

Aspects of this document relate generally to camera imaging systems, such as systems involving digital image sensors.

2. Background

Many camera systems utilize a focus system. During a typical manual or autofocus sequence, images are captured from various lens positions in order to determine the best focus position. The change in lens position results in a change in magnification of the image. This change in magnification of the image as the camera focus changes is visible to the user and is often referred to as "breathing."

SUMMARY

Implementations of a method of generating a breathing correction model may include: providing a Field of View/Distortion (FOV/D) test image, placing the FOV/D test image in the field of view of a lens included in a camera unit including an image sensor and a lens position sensor and moving the lens to a first focus distance. The method may also include storing a first image of the FOV/D test image in a memory included in the camera unit using the image sensor and determining a first lens position at the first focus distance using the lens position sensor. The method also may include generating a first calibrated Inverse FOV/D (IFOV/D) correction map by comparing FOV/D data of the first image with reference data stored in the memory associated with the FOV/D test image using a processor included in the camera unit. The method also may include storing the first calibrated IFOV/D correction map in the memory, moving the lens to a second focus distance, and storing a second image of the FOV/D test image in a memory included in the camera unit. The method also may include determining a second lens position at the second focus distance using the lens position sensor and generating a second calibrated IFOV/D correction map by comparing FOV/D data of the second image with reference data stored in the memory associated with the FOV/D test image using the processor. The method may also include storing the second calibrated IFOV/D correction map in the memory where the first calibrated IFOV/D correction map and second calibrated IFOV/D correction map may form a breathing correction model.

Implementations of a method of generating a breathing correction model may include one, all, or any of the following:

Moving the lens to a third focus distance, storing a third image of the FOV/D test image in the memory included in the camera unit, and determining a third lens position at the third focus distance using the lens position sensor. The method may also include generating a third calibrated IFOV/D correction map by comparing FOV/D data of the third image with reference data stored in the memory associated with the FOV/D test image using the processor. The method may also include storing the third calibrated IFOV/D correction map in the memory where the first calibrated IFOV/D, second calibrated IFOV/D correction map, and third calibrated IFOV/D correction form the breathing correction model.

The lens position sensor may be a Hall Effect sensor.

The breathing correction model may be stored in the memory in a look up table.

The FOV/D data of the first image and the FOV/D data of the second image may be calculated using a distortion model that is $3^{rd}$ order, $5^{th}$ order, or arctangent/tangent.

Implementations of a method of correcting for breathing effects for images may include capturing and displaying a first image to a user using a lens, an image sensor, memory, and a display included in a camera unit and adjusting a position of the lens. The method may also include capturing a second image with the lens and image sensor and storing data of the second image collected by the image sensor in the memory. The method also may include determining a second position of the lens at the time of the capturing of the second image using a lens position sensor included in the camera unit and calculating an IFOV/D correction map for the second position of the lens using a processor included in the camera unit and a breathing correction model stored in the memory. The method may also include applying the IFOV/D correction map to the data of the second image to generate corrected second image data using the processor, storing the corrected second image data in the memory, and displaying the corrected second image to a user using the display. The corrected second image may be substantially free from breathing effects when compared with the first image.

Implementations of a method of correcting for breathing effects for images may include one, all, or any of the following:

The breathing correction model may include at least a first calibrated IFOV/D correction map and a second calibrated IFOV/D correction map.

Calculating the IFOV/D correction map for the position for the second lens may further include interpolating the IFOV/D correction map using the second position of the lens and the at least first calibrated IFOV/D correction map and the second calibrated IFOV/D correction map.

FOV/D data used to generate the at least first calibrated IFOV/D correction map and the second calibrated IFOV/D correction map may be calculated using a distortion model that is $3^{rd}$ order, $5^{th}$ order, or arctangent/tangent.

The breathing correction model may be stored in a look up table.

The process or may be a graphics processor unit (GPU).

The lens position sensor may be a Hall Effect sensor.

Implementations of a method of correcting for breathing effects for images may include capturing and displaying a first image to a user using a lens, an image sensor, memory, and a display included in a camera unit, adjusting a position of the lens, capturing a second image with the lens and image sensor and storing data of the second image collected by the image sensor in the memory. The method may further include determining a second position of the lens at the time of the capturing of the second image using a lens position sensor included in the camera unit and calculating a change in magnification from the first image to the second image for the second position of the lens using a processor included in the camera unit and a breathing correction model stored in the memory. The method may also include rescaling the data of the second image to generate corrected second image data using the processor, storing the corrected second image data in the memory, and displaying the corrected second image to a user using the display. The corrected second image may be substantially free from breathing effects when compared with the first image.

Implementations of a method of correcting for breathing effects for images may include one, all, or any of the following:

The breathing correction model may include at least a first calibrated IFOV/D correction map and a second calibrated IFOV/D correction map.

Calculating a change in magnification from the first image to the second image may further include interpolating an IFOV/D correction map using the second position of the lens and the at least first calibrated IFOV/D correction map and the second calibrated IFOV/D correction map.

FOV/D data used to generate the at least first calibrated IFOV/D correction map and the second calibrated IFOV/D correction map may be calculated using a distortion model that is $3^{rd}$ order, $5^{th}$ order, or arctangent/tangent.

The breathing correction model may be stored in a look up table.

The processor may be a graphics processor unit.

The lens position sensor may be Hall Effect sensor.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended image breathing correction system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such image breathing correction systems, and implementing components and methods, consistent with the intended operation and methods.

Figure 3:
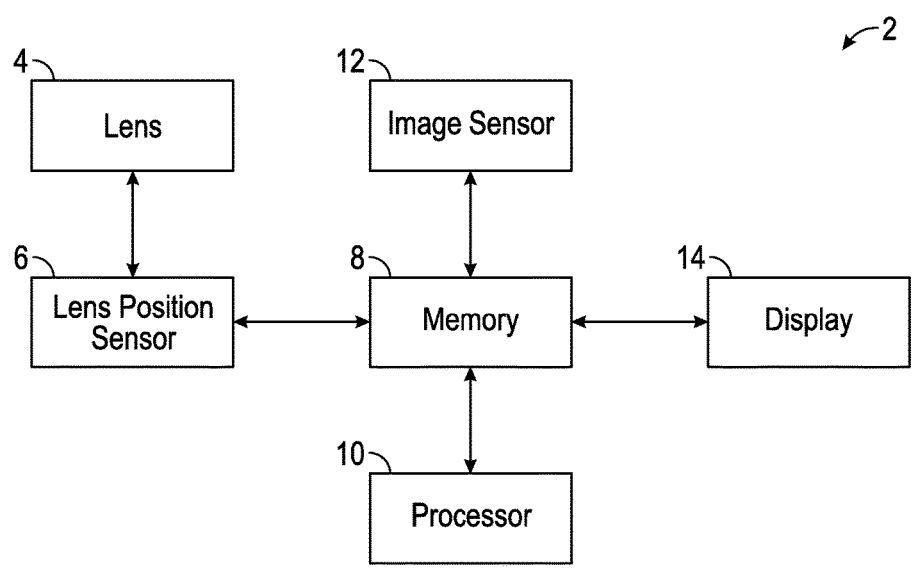
FIG. 3 is a block diagram of the components of a camera unit.

Referring to FIG. 3, a block diagram of the components of a camera unit 2 which form part or all of an image breathing correction system are illustrated. As illustrated, the camera unit 2 includes a lens 4 coupled to a body of the camera unit (not shown). The lens 4 is coupled to a lens position sensor 6 which is coupled with a memory 8 included in the camera unit 2. Operatively coupled with the memory 8 is a processor 10, an image sensor 12, and a display 14. In various implementations, the image sensor is a digital image sensor. The processor may be a graphics processor unit (GPU) or a central processing unit (CPU) in various implementations. The lens position sensor may be a Hall Effect sensor or other position sensing device.

A wide variety of image recording and storage devices may include these components. These include, by non-limiting example, camcorders, smartphone cameras, cell phone cameras, digital still cameras, mobile phones, digital cameras, video cameras, and other image capturing devices. In various of these devices, the need to focus the image being observed through the lens 4 onto the image sensor 12 is accomplished by manually or automatically moving the position of the lens 4 relative to the image sensor 12 (or vice versa). In various camera units, the focus may be accomplished by using an autofocus procedure. Depending on the structure of the lens itself, the lens may be formed of multiple elements. In some devices like digital still cameras and camcorders, the focus may be achieved by moving one or more elements of the lens itself rather than the entire lens. In other devices, such as mobile phones, the entire lens (multi-element or not) may be moved to achieve focus.

The movement of the lens causes the magnification of the image being viewed through the lens to change. Similar to the action of a magnifying glass or microscope, movement of the lens (or a component thereof) to change the focus also changes the magnification of the image. Because of this result, during an autofocus procedure, the image that is eventually displayed in focus is most likely to be either larger or smaller in magnification from the image that was initially viewed by the user on the display 14 of the camera unit 2. This change in magnification during focusing is referred to as "breathing." Conventional camera units do not correct for the breathing effect during focusing. For mobile phone devices, complex lenses operated using MEMS devices or electro-optical elements like liquid crystal lenses could be used to allow for movement of only one or a few pieces of the lens to minimize the breathing effect. However, even minimizing the amount of the lens that must move does not, in itself, eliminate or correct for the breathing effect.

Figure 2:
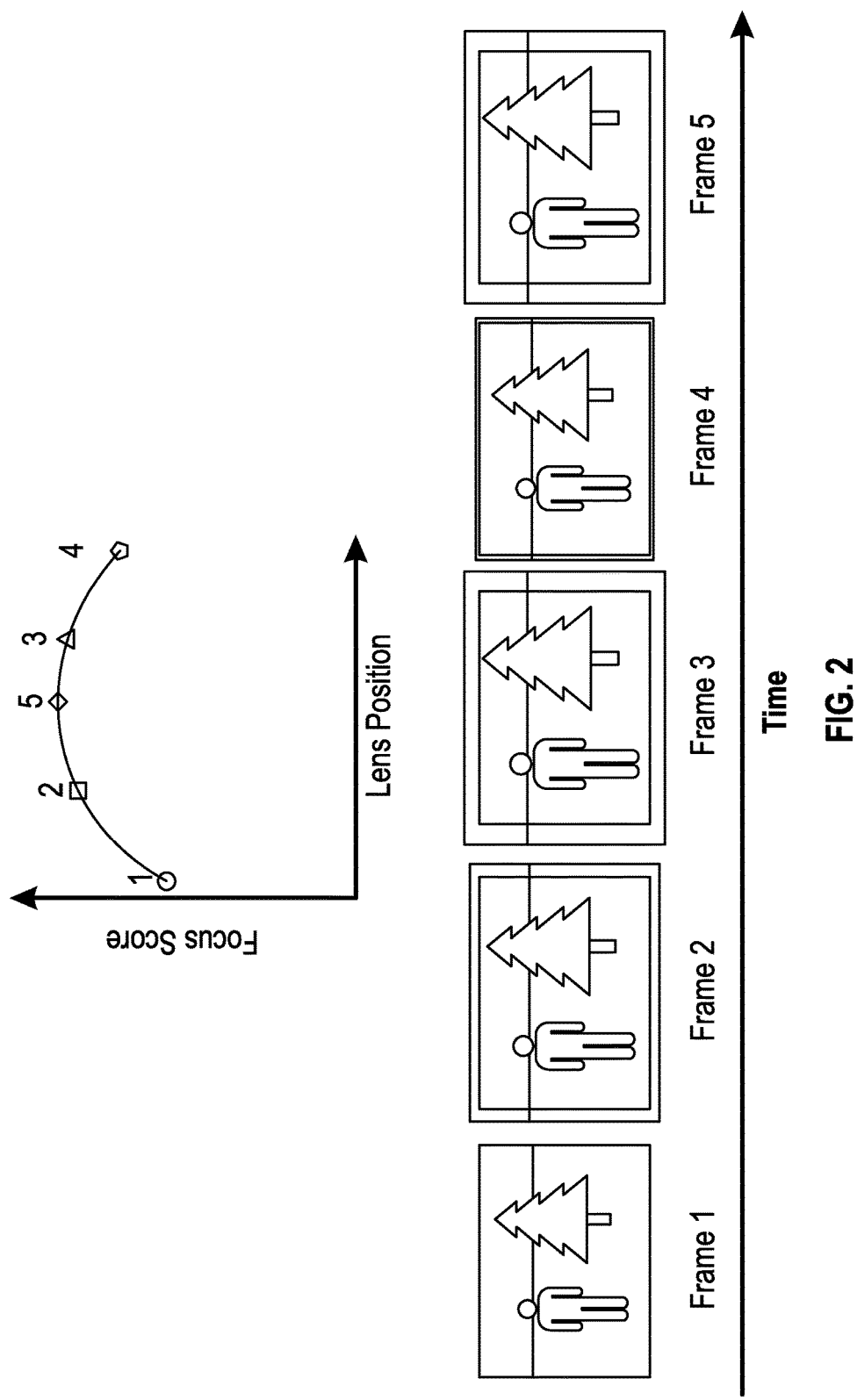
FIG. 2 is a diagram showing a graph of an autofocus process using focus scores above captured images demonstrating the breathing effect caused by movement of the lens.

FIG. 2 illustrates an autofocus process used by a camera unit to put the objects in view of the lens in a best focus. As illustrated in the graph above, a set of images are initially recorded in sequence and data for each is stored in the memory 8 and analyzed by the processor 10. The analysis for each image is the calculation of a focus score for the objects visible in the lens. The process of calculation of the focus score can take place using a variety of conventional methods and algorithms familiar to those of ordinary skill in the art. As can be observed, the autofocus process begins by first capturing a first image (Frame 1) at a first lens position and then causing the lens 4 to travel to a second lens position whereupon a second image (Frame 2) is captured. This process is iteratively repeated with the lens 4 moving to third, fourth, and ultimately fifth positions where a value of the focus score is maximized. Note that the size of the objects displayed in frame 5 is larger than the size of the objects in frame 1, demonstrating how, through breathing, the magnification of the objects has changed. While breathing has been explained in the context of autofocus, the same effect occurs when the focus is manually adjusted as well.

Methods of calculating a change in magnification based on the position of the lens and rescaling the data of the in-focus image are disclosed herein. A wide variety of methods can be used to calculate the change in magnification based on the position of the lens. For example, in particular implementations, various locations on the objects in view could be identified in a first image taken using the image sensor 12 through the lens 4 at a given lens position recorded by the lens position sensor. The X/Y translation of the various locations on the objects may then be determined by comparing the first image with the second in-focus image and the number/arrangement of pixels in the second image adjusted through interpolation and/or cropping to bring the size of the objects in the second image substantially equivalent to their size in the first image. Other methods may also be used, including the use of field of view (FOV) and distortion (lens distortion, D) data for the camera unit.

Figure 1:
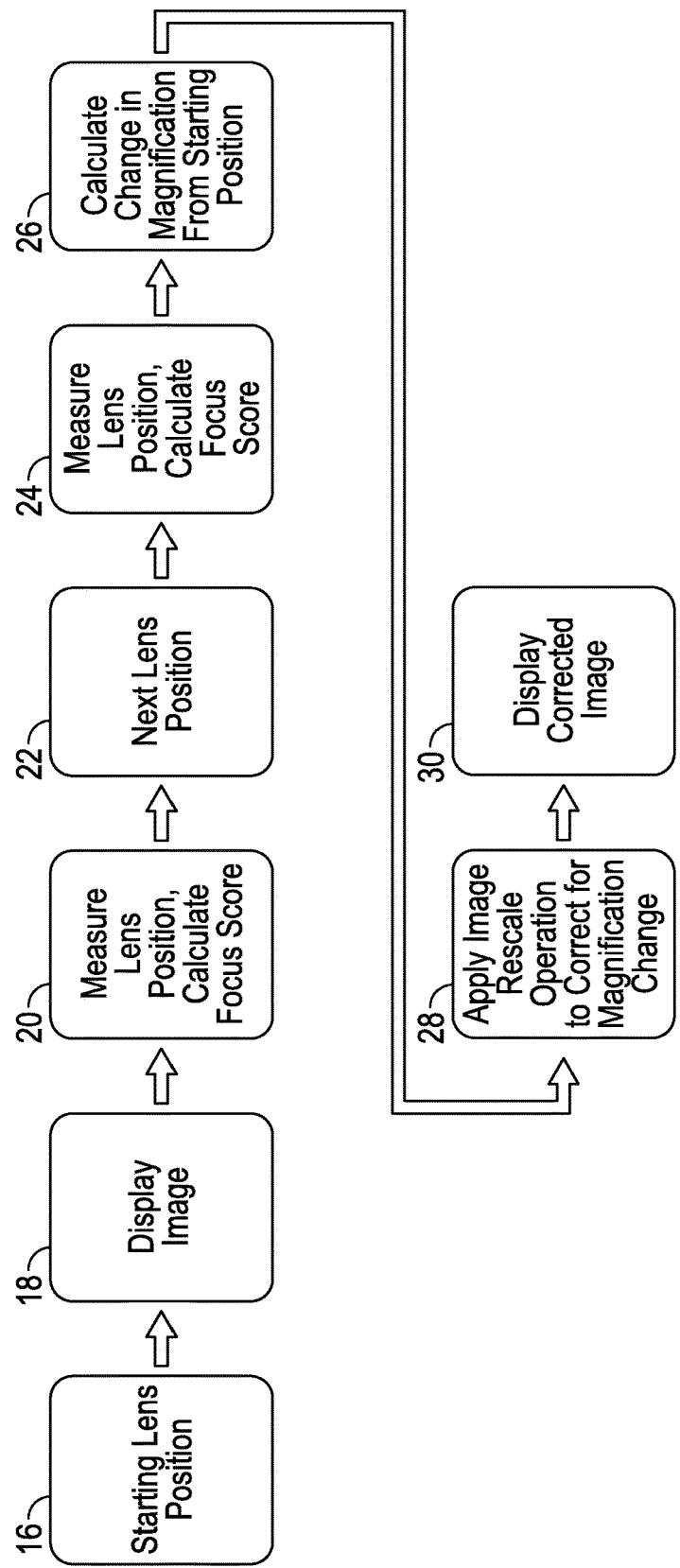
FIG. 1 is flow chart illustrating a method of breathing correction.

In particular implementations, the use of FOV/D data for the lens 4 may allow for the accurate rescaling of the image. In various implementations, the use of FOV/D data for the lens 4 may also allow for rescaling while not correcting any distortion of the corrected image simultaneously. Referring to FIG. 1, a flow diagram of an implementation of a method of breathing correction is illustrated. As illustrated, the lens 4 is brought to a starting lens position (step 16) and a first image is captured by the image sensor 12. The data associated with the first image is stored in the memory 8. In various implementations of the method, the first image is then displayed on the display 14 using the memory 8 and, in some implementations, the processor 10 (step 18). The lens position sensor 6 is then used to measure the lens position while the processor 10 is used to calculate a focus score for the first image (step 20). The camera unit 2 then moves the lens 4 to a second lens position where a second image is captured (step 22). The lens position sensor 6 is then used to measure the second lens position and the process is used to calculate a focus score for the second image (step 24). The processor then uses a breathing correction model stored in the memory and the data of the second image to calculate the change in magnification of the image from the starting position (step 26). The processor then conducts an image rescale operation to the data of the second image to correct for the magnification change (breathing effect, step 28). The camera unit 2 then may display the corrected second image substantially free from breathing effects when compared with the first image on the display 14 (step 30). Since the rescale operation is typically a mathematical/algorithm based on a model, precisely exact correction may be difficult to obtain, but substantially effective correction may be achieved, as will be appreciated by those of ordinary skill in the art. Since changes in distortion occur naturally as the lens is moved from the first lens position to the second lens position, there is still a change in distortion between the first image and the second image. However, depending on the implementation, the rescaling process may correct for this distortion change (and any existing distortion of the second image), may only rescale the second image, or may simultaneously correct for distortion and rescale.

Figure 4:
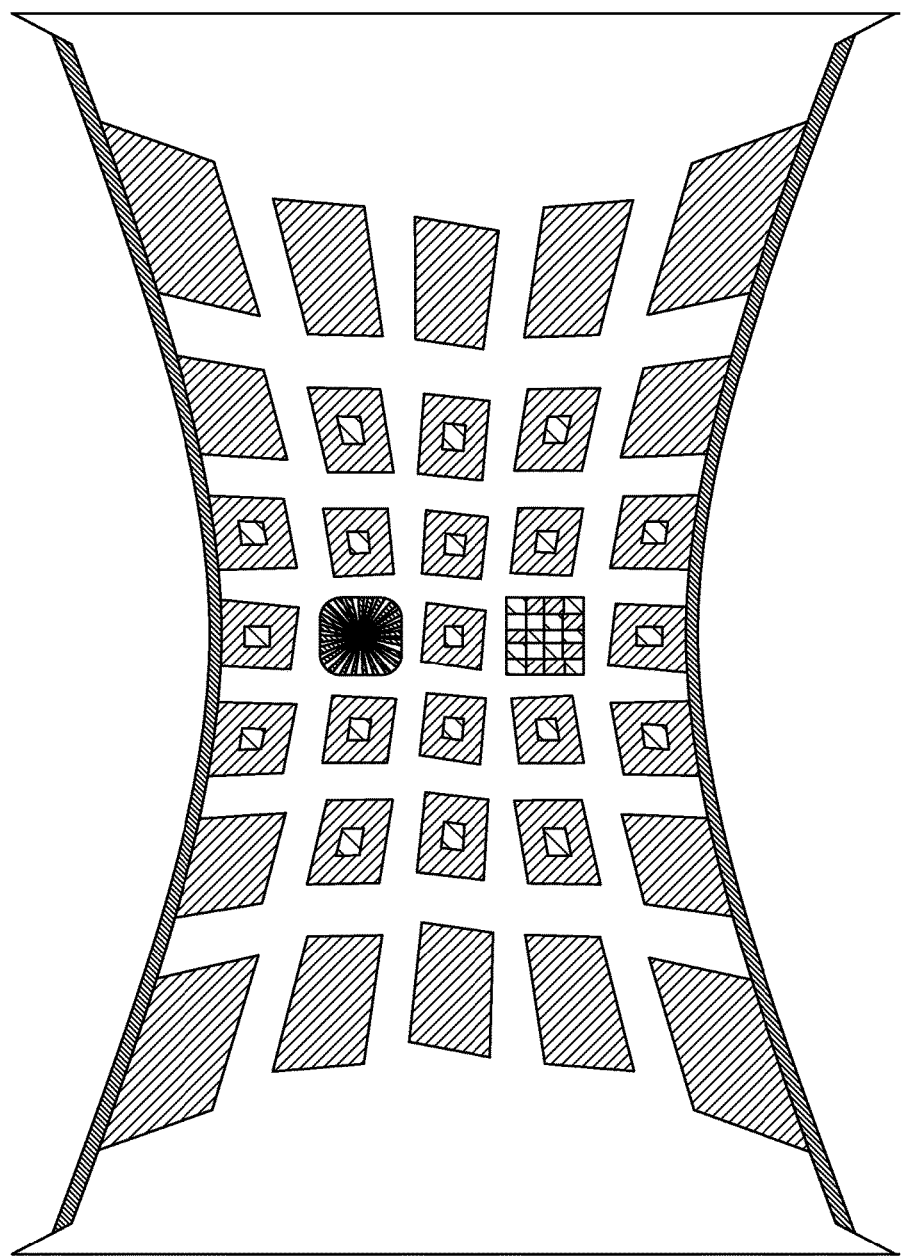
FIG. 4 illustrates an implementation of a Field of View/Distortion test image.

The breathing correction model may, in various implementations, be created using FOV/D data of the lens 4 and image sensor 12 of the camera unit 2. In various implementations, implementations a method of generating a breathing correction model may be used that involve creating of FOV/D data. The methods may include providing an FOV/D test image and placing the FOV/D test image in the field of view of the lens 4 (viewing the test image through the lens 4). FIG. 4 is an example of an implementation of a FOV/D test image that could be used in various method implementations. The method also includes moving the lens 4 to a first focus distance and storing a first image of the FOV/D test image in the memory 8 using the image sensor 12. The first lens position is determined using the lens position sensor 6. In particular implementations, the lens position is determined relative to the image sensor 12. The method also includes generating a first Inverse FOV/D (IFOV/D) correction map (first calibrated IFOV/D correction map) by comparing FOV/D data of the first image with reference data stored in the memory associated with the FOV/D test image using the processor 10. The reference data is preloaded into the memory prior to the taking of the first image, or is supplied to the memory 8 and/or the processor 10 during generating of the IFOV/D correction map.

In various implementations, the FOV/D data of the first image is calculated using a distortion model that is $3^{rd}$ order, $5^{th}$ order, or arctangent/tangent. The $3^{rd}$ order model is $r_u = r_d + k_1 r_d^3$ where $r_u$ is the undistorted radius; $r_d$ is the distorted radius. Both values of r are normalized to the center-to-corner distance. $k_1 = 0$ for no distortion; $k_1 < 0$ for pincushion distortion; $k_1 > 0$ for barrel distortion. The $5^{th}$ order model is $r_u = r_d + h_1 r_d^3 + h_2 r_d^5$. The arctangent/tangent models are $r_u = \tan(10 p_1 r_d)/(10 p_1)$; $k_1 > 0$ (barrel distortion) and $r_u = \tan^{-1}(10 p_1 r_d)/(10 p_1)$; $k_1 < 0$ (pincushion distortion). In these equations, p and h represent the distortion coefficients. Various optimization algorithms can be used to calculate the distortion coefficients. In particular implementations, the algorithm may find the straightest top and bottom bars and most even distances between the left edges and the right edges of the squares located at the center row of the FOV/D test image. Residual error (square root of the sum of squares of the errors) may be used to indicate how well the algorithm worked. The field of view data used may be either the angular field of view in degrees or the linear field of view.

Following calculation of the FOV/D data for the first image, the inverse FOV/D correction map is generated by creating a set of correction coefficients/values that, when applied to the data of the first image as originally captured, make the first image substantially the same in appearance as the FOV/D Test image. The calibrated inverse FOV/D correction map for the first image can then be stored in the memory 8 as part of the breathing correction model. In particular implementations, the IFOV/D correction map may be stored in a look up table in the memory 8 as part of the model.

The method also includes moving the lens 4 to a second focus distance and capturing and storing a second image of the FOV/D test image in the memory 8 included in the camera unit 2. The method also includes determining a second lens position at the second focus distance using the lens position sensor 6 and generating a second calibrated IFOV/D correction map by comparing FOV/D data of the second image with reference data stored in the memory 8 associated with the FOV/D test image using the processor 10. The method also includes storing the second IFOV/D correction map in the memory 8. The first and second IFOV/D correction maps then form part or all of the breathing correction model stored in the memory 8.

In various method implementations, the steps of moving the lens 4 to a new focus distance, capturing and storing an image of the FOV/D test image in the memory, generating a calibrated IFOV/D correction map, and storing the map in the memory as part of the breathing correction model may be repeated one or as many times as desired to build a breathing correction model. More than one FOV/D test image or other test images other than FOV/D test images may be used in various method implementations.

Methods of correcting for breathing effects for images may include capturing and displaying a first image to a user using the lens 4, image sensor 12, memory 8, and the display 14 of the camera unit 2 then adjusting the position of the lens 4. Various implementations may also include storing the first image in the memory 8 and/or determining the position of the lens 4 at the time of the capture of the first image. The method also includes capturing a second image with the lens 4 and image sensor 12 and storing data of the second image collected by the image sensor 12 in the memory 8. The method also includes determining a first position of the lens 4 at the time of the capture of the second image using the lens position sensor 6. Method implementations include calculating a change in magnification from the first image to the second image for the second position of the lens 4 using the processor 10 and the breathing correction model stored in the memory 8 and rescaling the data of the second image to generate corrected second image data using the processor.

In various method implementations, the breathing correction model includes at least the first and second calibrated IFOV/D correction map (IFOV/D correction map). Also, calculating a change in magnification from the first image to the second image further includes interpolating an IFOV/D correction map for the second image using the position of the lens at the time of the capturing of the second image and the at least first calibrated IFOV/D correction map and the second calibrated IFOV/D correction map. The calibrated IFOV/D correction maps may be generated using any method disclosed in this document.

The method may further include storing the corrected second image data in the memory and displaying the corrected second image to a user using the display where the corrected second image is substantially free from breathing effects when compared with the first image. To the user observing the second image in comparison with the first image, the objects in the second image appear substantially the same size without magnification even after the change in lens position. Implementations of methods of correcting for breathing effects may be used during autofocusing sequences, but they may also be used in other situations, such as during manual operation of the camera by the user.

In various method implementations, correction of the image may take place in one or both axes. In implementations where one axis is used for correction (such as the x or y axis), the correction process may involve using a one line buffer in the memory and applying the correction to form a corrected line of image data line by line at the same rate as the data of the second image is being read from the image sensor. In various implementations, a double buffer (two line) may be used to allow the processor to process the previously stored line (t−1) while the current line of data is being stored as it is read from the image sensor. In other implementations, the one line buffer may be sufficient provided the correction can be applied during the row blanking time of the buffer. In other implementations, more than two lines may be used, or the correction process may not take place until some, most, or all of the data of the second image has been read from the image sensor.

In places where the description above refers to particular implementations of image breathing correction systems and implementing components, sub-components, methods and sub-methods, it should be readily apparent that a number of modifications may be made without departing from the spirit thereof and that these implementations, implementing components, sub-components, methods and sub-methods may be applied to other image breathing correction systems and related methods.

What is claimed is:

1. A method of correcting for breathing effects for images comprising:
    providing a Field of View/Distortion (FOV/D) test image;
    placing the FOV/D test image in the field of view of a lens comprised in a camera unit comprising an image sensor and a lens position sensor;
    moving the lens to a first focus distance;
    storing a first image of the FOV/D test image in a memory comprised in the camera unit using the image sensor;
    determining a first lens position at the first focus distance using the lens position sensor;
    generating a first calibrated Inverse FOV/D (IFOV/D) correction map by comparing FOV/D data of the first image with reference data associated with the FOV/D test image and stored in the memory using a processor comprised in the camera unit;
    storing the first calibrated IFOV/D correction map in the memory;
    moving the lens to a second focus distance;
    storing a second image of the FOV/D test image in a memory included in the camera unit;
    determining a second lens position at the second focus distance using the lens position sensor;
    generating a second calibrated IFOV/D correction map by comparing FOV/D data of the second image with reference data associated with the FOV/D test image stored in the memory using the processor;
    storing the second calibrated IFOV/D correction map in the memory,
    wherein the first calibrated IFOV/D correction map and second calibrated IFOV/D correction map comprise a breathing correction model;
    capturing a third image with the lens and the image sensor; and
    applying the breathing correction model to the third image to generate a corrected third image, wherein breathing effects for the corrected third image are reduced.

2. The method of claim 1, further comprising:
    moving the lens to a third focus distance;
    storing a third image of the FOV/D test image in the memory included in the camera unit;
    determining a third lens position at the third focus distance using the lens position sensor;
    generating a third calibrated IFOV/D correction map by comparing FOV/D data of the third image with reference data stored in the memory associated with the FOV/D test image using the processor;
    storing the third calibrated IFOV/D correction map in the memory;
    wherein the first calibrated IFOV/D correction map, second calibrated IFOV/D correction map, and third calibrated IFOV/D correction map comprise the breathing correction model.

3. The method of claim 1, wherein the lens position sensor is a Hall Effect sensor.

4. The method of claim 1, wherein the breathing correction model is stored in the memory in a look up table.

5. The method of claim 1, wherein the FOV/D data of the first image and the FOV/D data of the second image are calculated using a distortion model that is one of 3rd order, 5th order, and arctangent/tangent.

6. A method of correcting for breathing effects for images comprising:
    capturing and displaying a first image to a user using a lens, an image sensor, memory, and a display comprised in a camera unit;

adjusting a position of the lens;

capturing a second image with the lens and image sensor and storing data of the second image collected by the image sensor in the memory;

determining a second position of the lens at the time of the capturing of the second image using a lens position sensor included in the camera unit;

calculating an inverse Field of View/Distortion (IFOV/D) correction map for the second position of the lens using a processor comprised in the camera unit and a breathing correction model stored in the memory, wherein the breathing correction model stored in the memory is calculated with a Field of View/Distortion (FOV/D) test image;

applying the IFOV/D correction map to the data of the second image to generate corrected second image data using the processor;

storing the corrected second image data in the memory; and displaying the corrected second image to a user using the display;

wherein the corrected second image is substantially free from breathing effects when compared with the first image.

7. The method of claim 6, wherein the breathing correction model comprises at least a first calibrated IFOV/D correction map and a second calibrated IFOV/D correction map.

8. The method of claim 7, wherein calculating the IFOV/D correction map for the second position of the lens further comprises interpolating the IFOV/D correction map using the second position of the lens and the at least first calibrated IFOV/D correction map and the second calibrated IFOV/D correction map.

9. The method of claim 7, wherein FOV/D data used to generate the at least first calibrated IFOV/D correction map and the second calibrated IFOV/D correction map was calculated using a distortion model that is one of 3rd order, 5th order, and arctangent/tangent.

10. The method of claim 6, wherein the breathing correction model is stored in a look up table.

11. The method of claim 6, wherein the processor is a graphics processor unit (GPU).

12. The method of claim 6, wherein the lens position sensor is a Hall Effect sensor.

13. A method of correcting for breathing effects for images comprising:

capturing and displaying a first image to a user using a lens, an image sensor, memory, and a display comprised in a camera unit;

adjusting a position of the lens;

capturing a second image with the lens and image sensor and storing data of the second image collected by the image sensor in the memory;

determining a second position of the lens at the time of the capturing of the second image using a lens position sensor included in the camera unit;

calculating a change in magnification from the first image to the second image for the second position of the lens using a processor comprised in the camera unit and a breathing correction model stored in the memory, wherein the breathing correction model stored in the memory is calculated with a Field of View/Distortion (FOV/D) test image;

rescaling the data of the second image to generate corrected second image data using the processor;

storing the corrected second image data in the memory; and displaying the corrected second image to a user using the display;

wherein the corrected second image is substantially free from breathing effects when compared with the first image.

14. The method of claim 13, wherein the breathing correction model comprises at least a first calibrated IFOV/D correction map and a second calibrated IFOV/D correction map.

15. The method of claim 14, wherein calculating a change in magnification from the first image to the second image further comprises interpolating an IFOV/D correction map using the second position of the lens and the at least first calibrated IFOV/D correction map and the second calibrated IFOV/D correction map.

16. The method of claim 14, wherein FOV/D data used to generate the at least first calibrated IFOV/D correction map and the second calibrated IFOV/D correction map was calculated using a distortion model that is one of 3rd order, 5th order, and arctangent/tangent.

17. The method of claim 13, wherein the breathing correction model is stored in a look up table.

18. The method of claim 13, wherein the processor is a graphics processor unit (GPU).

19. The method of claim 13, wherein the lens position sensor is a Hall Effect sensor.

* * * * *

UNITED STATES PATENT AND TRADEMARK OFFICE
CERTIFICATE OF CORRECTION

PATENT NO. : 10,127,474 B2
APPLICATION NO. : 15/165161
DATED : November 13, 2018
INVENTOR(S) : Jonathan Michael Stern Page 1 of 1

It is certified that error appears in the above-identified patent and that said Letters Patent is hereby corrected as shown below:

In the Claims

In Column 10, Line 17, Claim 13 delete "resealing" and replace with -- rescaling --.

Signed and Sealed this
Twelfth Day of March, 2019

Andrei Iancu
*Director of the United States Patent and Trademark Office*